Figure 1:
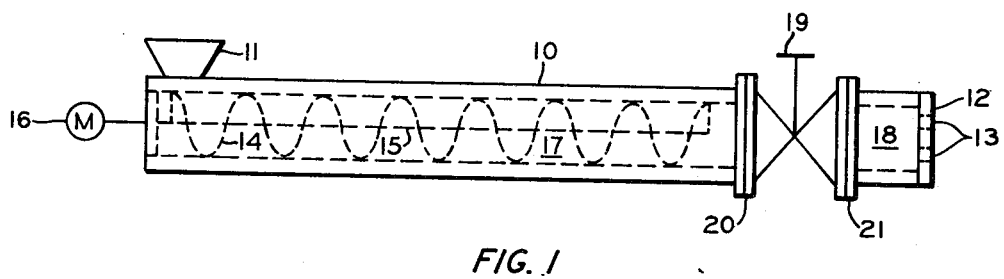

United States Patent [19]

Kosinsky

[11] B 3,924,997

[45] Dec. 9, 1975

[54] APPARATUS FOR DRYING POLYMERIC MATERIAL

[75] Inventor: Edward J. Kosinsky, Bartlesville, Okla.

[73] Assignee: Phillips Petroleum Company, Bartlesville, Okla.

[22] Filed: Aug. 21, 1972

[21] Appl. No.: 282,252

[44] Published under the Trial Voluntary Protest Program on January 28, 1975 as document no. B 282,252.

[52] U.S. Cl. ................. 425/376; 425/462; 425/466
[51] Int. Cl.² .......................... B29F 1/03; B29F 1/06
[58] Field of Search ........... 425/376, 461, 462, 465, 425/466, 467; 251/110, 195, 196, 326, 327; 137/609; 34/42

[56] References Cited
UNITED STATES PATENTS

| | | | |
|---|---|---|---|
| 1,727,161 | 9/1929 | Dupuis | 251/326 X |
| 2,174,861 | 10/1939 | Olson | 251/326 X |
| 3,463,193 | 8/1969 | Yost | 251/326 X |
| 3,478,771 | 11/1969 | Johnson | 251/327 X |
| 3,512,266 | 5/1970 | Welty | 34/42 |

FOREIGN PATENTS OR APPLICATIONS

| | | | |
|---|---|---|---|
| 888,219 | 1/1962 | United Kingdom | 251/327 X |

Primary Examiner—Andrew R. Juhasz
Assistant Examiner—David B. Smith

[57] ABSTRACT

This invention resides in an improved apparatus for removing liquid from liquid-bearing polymeric material. The apparatus has an elongated shell having an upstream feed opening and a downstream discharge zone, a means positioned in a first zone within said elongated shell for working and compacting the material passed therethrough and through a second downstream zone to the discharge zone of the shell, a restriction means positioned between said first and second zone for restricting the passage of material from said first zone to said second zone adjacent said discharge zone for reducing the pressure on the material passing said restriction means, and a die having at least one orifice and being positioned downstream of said restriction means and at said discharge zone for reducing the pressure on the material passing through the orifice of said die. The restriction means is a valve having a valve body, an opening extending therethrough in fluid communication with the first and second zones, and a valve plug having sidewalls and bottom walls of matable, planar configuration with said valve plug being slidably movable relative to the valve body into and from said opening.

7 Claims, 4 Drawing Figures

U.S. Patent  Dec. 9, 1975  3,924,997

APPARATUS FOR DRYING POLYMERIC MATERIAL

It is desirable to provide an apparatus for removing liquid from polymeric material without producing excessive fines, and without apparatus locations at which polymer can accumulate, burn, and thereafter reenter the polymer stream and contaminate said stream.

In the production of solid polymers such as rubber and resins and in the processing of natural rubber or other polymeric material, it is frequently necessary to be able to remove liquid, such as an organic solvent or water, from the material by vaporization without degrading the polymeric material itself.

One method which has been used very successfully to deliquefy polymers and particularly synthetic rubber crumb involves the use of a continuous extrusion device which is generally referred to as an expander-dryer. This device applies mechanical energy to the liquid-bearing polymeric material by working the material with a rotating screw within an elongated enclosure which can be jacketed to permit additional heating by indirect heat exchange. The polymeric material is worked in this way sufficiently to increase its temperature so that its sensible heat is sufficient to provide the heat of vaporization of most of the liquid which is to be removed. The elevated pressures developed within the device are sufficient to prevent vaporization of the liquid within the enclosure, but immediately upon discharge of the material through an orifice, the pressure is released and the liquid vaporizes with an explosive effect enabling rapid and almost complete removal of the liquid from the polymeric material. In addition, the polymeric material after being discharged from the expander-dryer is left in an expanded, semi-porous condition which enables the remaining moisture to be easily vaporized by heating at temperatures which are not excessive and do not degrade the polymer.

An expander-dryer which is widely used in the rubber industry is one marketed by V. D. Anderson Company and is described in the patent to Zies, U.S. Pat. No. 3,222,797 issued Dec. 14, 1965. The use of an expander-dryer of this type in a continuous recovery operation for the manufacture of synthetic rubber is described in the patent to Davis, U.S. Pat. No. 3,240,746 issued Mar. 15, 1966.

While some polymers can be dried with an expander-dryer at suitable rates without difficulty, some polymeric materials have a tendency to disintegrate into fine particles during the explosive vaporization which occurs upon discharge of the material from the discharge orifices of the dryer die plate. Although the production of discrete particles does not diminish the effectiveness of the drying operation, it produces a housekeeping problem since the fines are more difficult to confine and convey to subsequent drying and baling operations. These fines tend to accumulate on surfaces which they contact, requiring frequent cleaning. Also accumulated fines near the die plate tend to accumulate liquid water and it has been found that this is a source of white spots which sometimes are observed in baled rubber. The production of particles of a polymer at this point in the operation with the accompanying fines inevitably results in an increased amount of recycle of polymer which has reached as high as 10 to 15 percent of the net production.

This invention therefore resides in an improved apparatus for removing liquid from liquid-bearing polymeric material. The apparatus has an elongated shell having an upstream feed opening and a downstream discharge zone, a means positioned in a first zone within said elongated shell for working and compacting the material passed therethrough and through a second downstream zone to the discharge zone of the shell, a restriction means positioned between said first and second zone for restricting the passage of material from said first zone to said second zone adjacent said discharge zone for reducing the pressure on the material passing said restriction means, and a die having at least one orifice and being positioned downstream of said restriction means and at said discharge zone for reducing the pressure on the material passing through the orifice of said die. The restriction means is a valve having a valve body, an opening extending therethrough in fluid communication with the first and second zones, and a valve plug having sidewalls and bottom walls of matable, planar configuration with said valve plug being slidably movable relative to the valve body into and from said opening.

Other aspects, objects, and advantages of the present invention will become apparent from a study of the disclosure, the appended claims, and the drawings.

The drawings are diagrammatic views of the apparatus of this invention.

Figure 2:
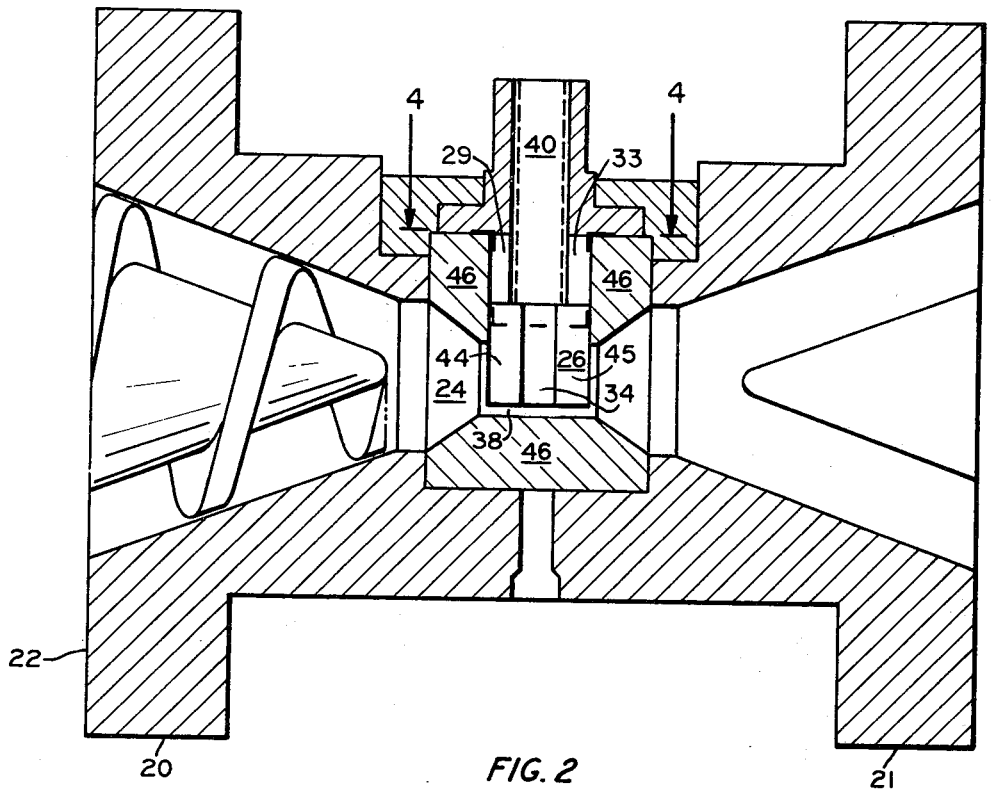
Figures 3, 4:
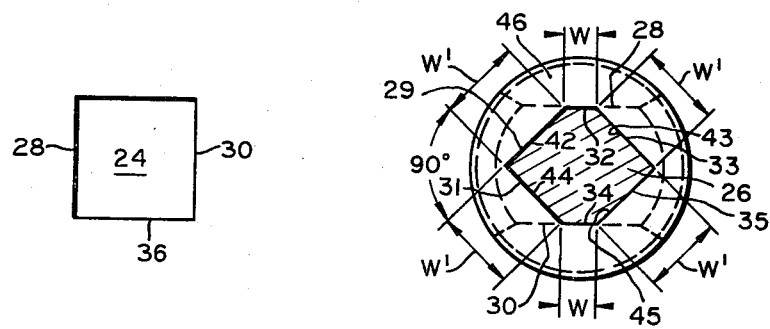

FIG. 1 shows an expander-dryer having a variable restriction means between the screw and the discharge zone, FIG. 2 shows an enlarged frontal view in partial section of the restriction means, FIG. 3 shows a sectional view of the opening of the restriction means, and FIG. 4 shows a sectional plan view, along line 4—4 of FIG. 2, of the valve plug positioned in the opening and within a valve insert.

Referring to FIG. 1, an expander-dryer of the type described by Zies is disclosed schematically. This dryer comprises an elongated enclosure 10 which contains a feed hopper 11 and a die plate 12 in a discharge zone at the discharge end. The die plate is provided with at least one, preferably a number of orifices 13. The rubber which is fed to the expander-dryer is moved through the enclosure 10 and subjected to mechanical work by for example a helical screw 14 on shaft 15 driven by motor 16. The helical screw is positioned within an upstream first zone 17 of the elongated enclosure and it is within this first zone that the working pressure must be developed. This working pressure is understood to be the maximum pressure developed within this zone and is determined at the downstream end of the working zone 17. A second zone 18 is provided within the elongated enclosure immediately upstream of the discharge point. As shown in FIG. 1, the pressure reduction between zones 17 and 18 is provided by a valve 19 which is illustrated, for ease of installation, mounted between flanges 20 and 21.

Referring to FIG. 2, the restriction means or valve has a valve body 22, an opening 24 extending therethrough in fluid communication with the first and second zones 17, 18, and a valve plug 26 movably positioned within said opening 24.

Referring to FIGS. 3 and 4, the opening 24 and the valve plug 26 have sidewalls 28, 30, and 32, 34 and bottom walls 36 and 38 (see FIG. 2 for 38) of matable, planar configurations. The valve plug 26 is slidably, transversely movable by valve stem 40 (FIG. 2) into and from said opening 24.

As shown in FIG. 4, the valve plug 26 preferably has a hexagonal cross-sectional configuration with first and second opposed sidewalls 32, 34 of the valve plug contacting opposed sidewalls 28, 30 of the opening 24. In this configuration, the angle between the third and fourth adjacent walls 42, 44 of the valve plug 26 extend upstream from their respective first and second sidewalls 32, 34 of the valve plug is in the range of about 60°–120°. This preferred configuration provides a valve plug that is easily maintained within the opening during subjection of relatively large pressures while being easy to manufacture thereby saving labor and equipment. Angles less than about 60° are undesirable because the valve plug would be excessively bulky and would represent a waste of material and labor, and angles greater than about 120° are undesirable because material would tend to be maintained adjacent the valve plug there to burn and subsequently pollute the material stream.

It is also preferred that the first and second opposed sidewalls 32, 34 of the valve plug each have a width W less than the width W' of the other walls of the valve plug. By forming walls 32, 34 of this construction, the friction during movement of the valve plug 26 is reduced thereby reducing wear of the valve elements and decreasing the force required to move the valve plug 26.

The opening is preferably of a square or rectangular configuration for substantially eliminating situs at which polymer or material can accumulate and to provide an adequate flow area. Further, it is preferred that the opening of the valve body 22 be adapted to receive and maintain valve inserts 46 therein with said inserts 46, in the installed position, forming the opening 24 having planar sidewalls 28, 29, 30, 31, 33, 35 matable with the planar walls 32, 42, 34, 44, 43, 45 of the valve plug. In this construction, as the valve wears, the inserts can be replaced to maintain a fluid seal. Further, the opening dimensions can be easily changed by changing inserts.

In the operation of the valve of this invention, burned, contaminating polymer is not detectable owing to the fact that polymer did not hang up, burn, and be displaced into the polymer stream on the apparatus having the valve of this invention.

Other modifications and alterations of this invention will become apparent to those skilled in the art from the foregoing discussion and accompanying drawing, and it should be understood that this invention is not to be unduly limited thereto.

I claim:

1. In an apparatus for removing liquid from liquid-bearing polymeric material comprising an elongated shell having an upstream feed opening and a downstream discharge zone, means in a first zone within said elongated shell for working and compacting the material passed therethrough and through a second downstream zone adjacent said discharge zone to the discharge zone of said elongated shell, a restriction means positioned between said first and second zone for restricting the passage of material from said first zone to said second zone for reducing the pressure on the polymeric material passing through said restriction means, and a die having at least one orifice and being positioned downstream of said restriction means and said second zone and at said discharge zone for reducing the pressure on the material passing through the orifice of said die, the improvement comprising:

said restriction means being a valve having a valve body, an opening extending therethrough in fluid communication with the first and second zones, and a valve plug movably positioned within said valve body, said opening and said valve plug each having sidewalls and bottom walls of matable, planar configurations, said valve plug being slidably movable into and from said opening, and said valve plug having a hexagonal cross-sectional configuration with first and second opposed sidewalls of the valve plug contacting opposed side walls of said opening.

2. An apparatus, as set forth in claim 1, wherein the opening of the valve body is adapted to receive and maintain valve inserts therein with said inserts in the installed position forming the opening having planar sidewalls matable with the planar walls of the valve plug.

3. An apparatus, as set forth in claim 1, wherein the opening is a rectangular opening.

4. An apparatus, as set forth in claim 1, wherein third and fourth adjacent walls of the valve plug are adjacent said first and second sidewalls of the valve plug respectively and extend upstream from said first and second sidewalls.

5. An apparatus, as set forth in claim 4, wherein the angle between said third and fourth adjacent walls of the valve plug is within the range of from about 60° to about 90°.

6. An apparatus, as set forth in claim 5, wherein fifth and sixth adjacent walls of the valve plug are adjacent first and second sidewalls of the valve plug respectively and extend downstream from said first and second sidewalls of the valve plug.

7. An apparatus, as set forth in claim 6, wherein the first and second opposed sidewalls each have a width (W) less than the width (W') of the other walls of the valve plug.

* * * * *